United States Patent
Bonnard et al.

(10) Patent No.: US 7,363,041 B2
(45) Date of Patent: Apr. 22, 2008

(54) DEVICE AND A METHOD FOR USE IN A MOBILE TELEPHONE DEVICE FOR PROCESSING LOCATION DATA BY DETECTING GEOLOCATION PARAMETERS OF AN AREA OR AREAS OF A NETWORK

(75) Inventors: Pierre Bonnard, Suresnes (FR); Valerie Nomain, Paris (FR)

(73) Assignee: Alcatel, Paris (FR)

( * ) Notice: Subject to any disclaimer, the term of this patent is extended or adjusted under 35 U.S.C. 154(b) by 474 days.

(21) Appl. No.: 10/635,635

(22) Filed: Aug. 7, 2003

(65) Prior Publication Data
US 2004/0132462 A1 Jul. 8, 2004

(30) Foreign Application Priority Data
Aug. 8, 2002 (FR) ................... 02 10084

(51) Int. Cl.
*H04Q 7/20* (2006.01)
(52) U.S. Cl. ................. 455/456.1; 455/404.2; 455/417; 455/422.1; 455/444
(58) Field of Classification Search ........... 455/408, 455/445, 433, 414, 435, 417, 422, 444, 456.1, 455/422.1, 404.2
See application file for complete search history.

(56) References Cited

U.S. PATENT DOCUMENTS 6,044,261 A * 3/2000 Kazmi ................ 455/408
6,591,105 B1 * 7/2003 Hussain et al. ............ 455/444
2002/0065711 A1 5/2002 Fujisawa et al.
2002/0098832 A1 7/2002 Fleischer et al.

FOREIGN PATENT DOCUMENTS

| | | |
|---|---|---|
| EP | 1 119 211 A2 | 7/2001 |
| FR | 2 811 192 A1 | 2/2003 |
| WO | WO 00/04730 | 1/2000 |

\* cited by examiner

*Primary Examiner*—Duc M. Nguyen
*Assistant Examiner*—Wayne Cai
(74) *Attorney, Agent, or Firm*—Sughrue Mion, PLLC

(57) ABSTRACT

A location data processing device (D) for a mobile telephone device (UE) which can move in geographical areas of a communication network defined by sets of location parameters. the processing device includes processing means adapted i) to determine the geographical area in which the mobile telephone device (UE) is located at predetermined times, and then to store temporarily a set of location parameters representative of said detected geographical area, and ii) to analyze the sets of location parameters stored at chosen intervals, in order to store each set of location parameters satisfying at least one chosen criterion.

39 Claims, 2 Drawing Sheets

DEVICE AND A METHOD FOR USE IN A MOBILE TELEPHONE DEVICE FOR PROCESSING LOCATION DATA BY DETECTING GEOLOCATION PARAMETERS OF AN AREA OR AREAS OF A NETWORK

BACKGROUND OF THE INVENTION

Field of the Invention

The field of the invention is that of mobile telephones and more particularly that of managing a mobile telephone device as a function of its geographical position.

Some cellular communication networks include a core network connected to an access network including a multiplicity of nodes providing access to the core network and connected to base stations that control one or more cells inside which the mobile telephone devices can exchange data with the network.

When a mobile telephone device enters a cell of a cellular network, the latter sends it location data constituting a set of geolocation parameters, so that it always knows in which cell (geographical area) it is located. In the present context the term "geographical area" means a space defined by or on the basis of one or more cells and the expression "set of (geo)location parameters" means one or more cell identifiers and where applicable radio information representative in particular of the receive power of the base station controlling the cell and/or the distance to the base station controlling the cell (which is also known as the "timing advance"). If the mobile telephone device has a plurality of operating configuration profiles associated with different geographical areas, the set of location parameters enables automatic setting up of the configuration that corresponds to the area the device is entering without requiring intervention by the user. This type of mobile telephone device is described in particular in the patent document FR 2 811 192.

BRIEF SUMMARY OF THE PRESENT INVENTION

This automated operation is particularly beneficial, but requires the user not only to define each operating configuration profile but also to define the geographical areas associated with the configuration profiles. Defining geographical areas and associating them with configuration profiles are complicated operations, especially for mobile telephones. The patent document FR 2 811 192 proposes using a computer to effect the definitions, but this requires dedicated software and transfer of the definitions from the computer to the mobile telephone.

Thus an object of the invention is to improve the above situation.

To this end it proposes a method of treating location data for a mobile telephone device which can move in geographical areas of a communication network, said geographical areas being defined by sets of location parameters, in which method, firstly, the geographical area in which the mobile telephone device is located is detected at predetermined times (for example every two minutes), then a set representative of the detected geographical area is stored temporarily, and, secondly, the stored sets of location parameters are analyzed at chosen intervals (for example every three days), so that only sets of location parameters satisfying at least one chosen criterion are retained.

Accordingly, the small number of geographical areas (generally two or three areas) in which the user is usually located can be detected automatically by the mobile telephone device and then stored in order to be associated with operating configuration profiles.

The method according to the invention can have further features separately or in combination and in particular:
  the detection can be periodic,
  the analysis can consist in determining the sets of location parameters and then counting out each set so as to store only the sets of location parameters associated with a number greater than a chosen threshold, the chosen criterion consisting of crossing the threshold to a value above the threshold. Alternatively, after counting out the sets of location parameters, their respective relative proportions can be determined in order to store each set of location parameters associated with a proportion greater than a chosen threshold,
  the detected geographical area can be stored temporarily in corresponding relationship to at least its time of detection,
  the set of location parameters can be stored, after analysis, in corresponding relationship to chosen information. In this case, the information can be representative of a time interval associated with each set of location parameters satisfying the chosen criterion.
  the method can include an additional step in which a chosen status is associated with the stored sets of location parameters. In this case, the status association can be effected automatically as a function of the information or at the initiation of the user of the mobile telephone device, for example by selecting a status from a set of statuses displayed on the screen of his mobile telephone device. Further, the status is preferably a field associated with an operating configuration of the mobile telephone device. This kind of field can be selected from the group including at least "Home", "Office" and "Other" fields. Further, at least two different sets of location parameters satisfying the criterion can be associated with the same status.

The invention also provides a location data processing device for a mobile telephone device which can move in geographical areas of a communication network defined by sets of at least one location parameter. The device is characterized in that it includes processing means adapted, firstly, to determine the geographical area in which the mobile telephone device is located at predetermined times, and then to store temporarily a set of location parameters representative of said detected geographical area, and, secondly, to analyze the sets of location parameters stored at chosen intervals, in order to store each set of location parameters satisfying at least one chosen criterion.

The processing device according to the invention can have further features separately or in combination and in particular its processing means can:
  effect detection periodically,
  effect the analysis on the basis of a determination of different sets of location parameters, followed by counting out each set of location parameters, and store each set of location parameters in association with a number above a chosen threshold, the chosen criterion consisting in the crossing of the threshold to a value above the threshold. Alternatively, after counting out the sets of location parameters, the processing means can determine their respective relative proportions and store each set associated with a proportion above a chosen threshold,
  store the detected geographical area temporarily in corresponding relationship to at least its detection time, store each set of location parameters, after analysis, in corresponding relationship to chosen information. In this case, the information can be representative of a time interval associated with each set satisfying the chosen criterion, associate the stored sets of location parameters with a chosen status. In this case, the status association can be effected automatically as a function of information or at the initiative of the user of the mobile telephone device, for example by selecting a status from a set of statuses displayed on a screen of his device. Further, the status is preferably a field associated with an operating configuration of the mobile telephone device. For example, the field can be selected from a group including at least "Home", "Office" and "Other" fields. Further, at least two different sets of location parameters satisfying the chosen criterion can be associated with the same status.

Further, whether in relation to the processing method or the processing device, each set of location parameters can include at least one parameter representative of a network cell identifier, and some sets can include at least one additional parameter selected from a group including at least radio information representative of the receive power of a base station controlling the cell and/or the distance to the base station controlling the cell.

The invention also provides a mobile telephone device that is able to move in geographical areas of a communication network defined by sets of location parameters and includes a processing device of the type described hereinabove.

BRIEF DESCRIPTION OF THE DRAWINGS

Other features and advantages of the invention will become apparent on reading the following detailed description and examining the appended drawing, in which.

The appended drawing can serve not only to describe the invention but also, where applicable, contribute to defining it.

DETAILED DESCRIPTION OF EXEMPLARY EMBODIMENTS OF THE PRESENT INVENTION

Figure 1:
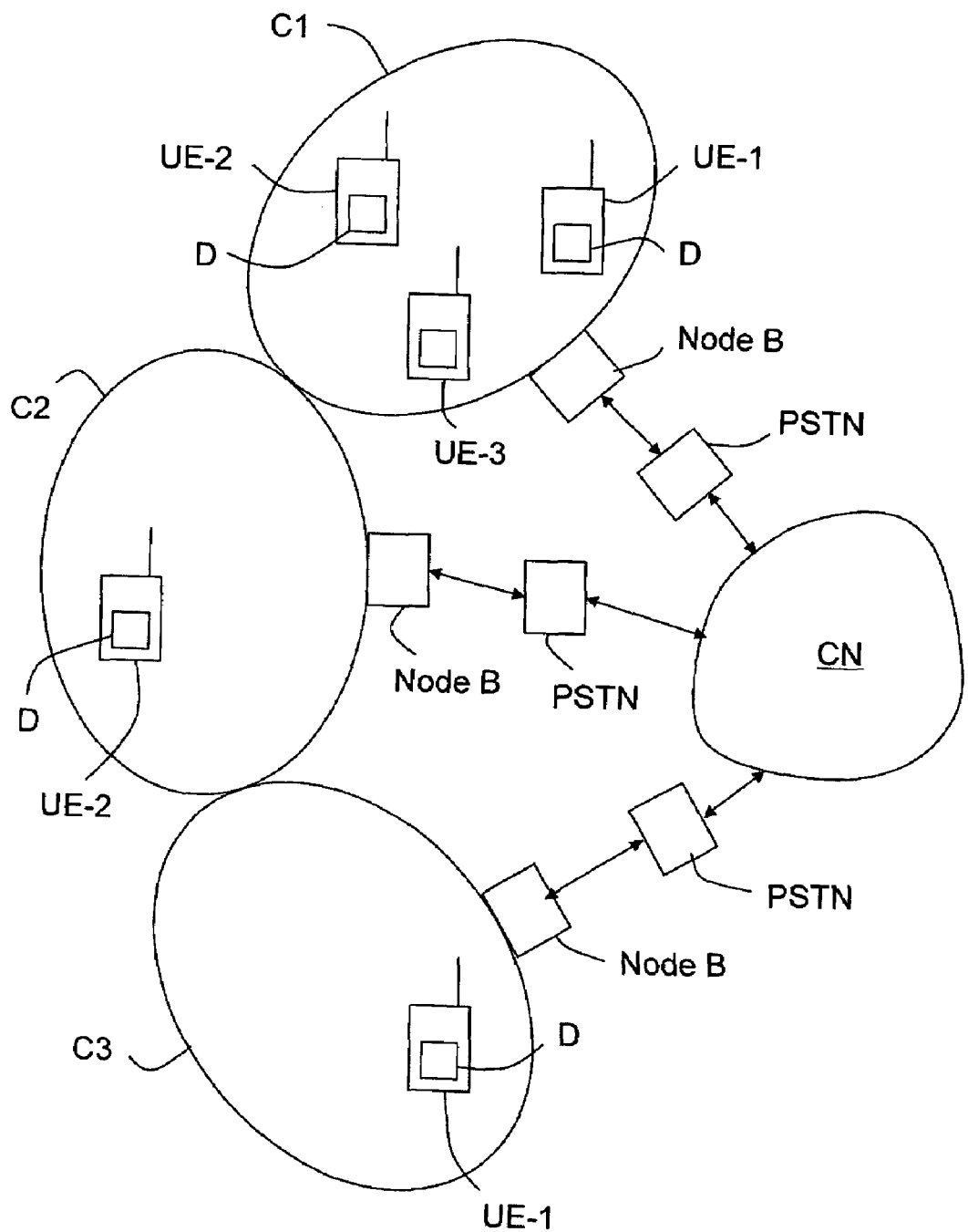
FIG. 1 shows diagrammatically a portion of a cellular communication network to which are connected user mobile terminals equipped with a processing device according to the invention.

The processing device according to the invention is designed to be installed in mobile telephone devices (also known as user mobile terminals), such as mobile telephones, connected to a public land mobile network PLMN, such as 2G or 2.5G networks, for example GSM or GPRS networks, or 3G networks, such as the UMTS network. FIG. 1 shows this kind of network. The invention is not limited to this kind of network, however. It applies generally to all cellular networks and in particular to TDMA, CDMA, CDMA-One, PHS and FOMA networks.

The above type of network, referred to as a cellular network, can be described very schematically, although in sufficient detail to understand the invention, as comprising a core network CN connected to an access network including:

a plurality of nodes connected to the core network CN via an Iu interface and known as base station controllers (BSC) in GSM and GPRS networks and as radio network controllers (RNC) in UMTS networks; and a plurality of base transceiver stations each associated with one or more cells each covering a radio area, connected individually or in groups of at least two to one of the nodes via an Iub logical interface, and known as base transceiver stations (BTS) in a GSM or GPRS network or Nodes B in a UMTS network.

In the following description, which is given by way of nonlimiting example, the network is a UMTS network and the mobile telephone devices are mobile telephones UE-i (in this example i=1 to 3), where applicable able to exchange data in accordance with the Wireless Application Protocol (WAP) with other network equipment. For the purposes of illustration, each base station, in this example each node B, controls only one cell $C_i$ (in this example i=1 to 3) defining a geographical area (treated hereinafter as interchangeable with the corresponding cell $C_i$). Of course, the Nodes B could control more than one cell and a geographical area could be defined by more than one cell or on the basis of portions of one or more cells (in some cases a geographical area can be smaller or larger than a cell).

Figures 1, 2:
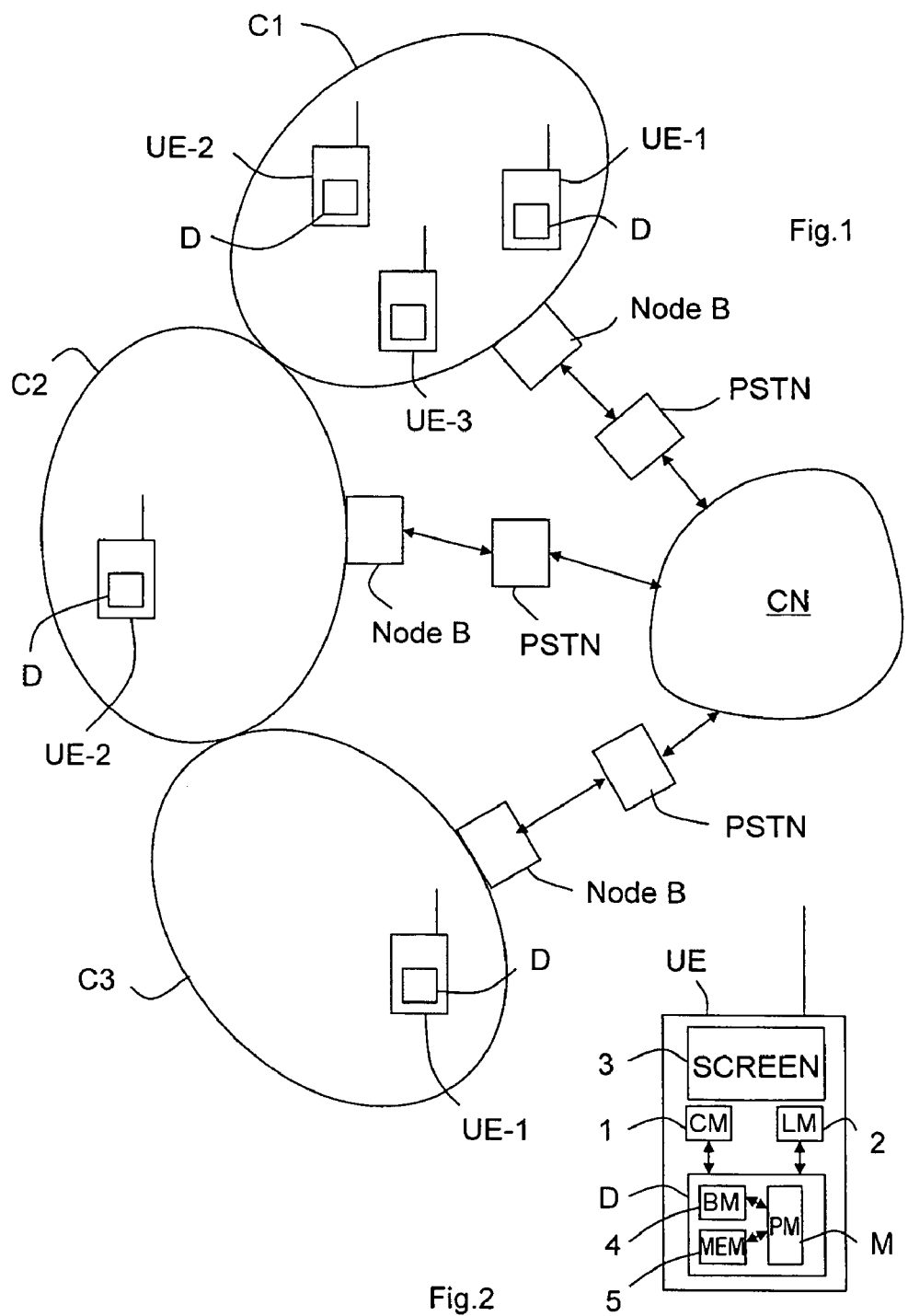
FIG. 2 shows diagrammatically one embodiment of a processing device according to the invention installed in a user mobile terminal that can be connected to a network of the type shown in FIG. 1.

As shown in FIG. 2, the processing device D according to the invention is connected to the operating configuration module 1 and to the location module 2 of the mobile telephone UE-i in which it is installed.

The operating configuration module 1 is designed to store sets of configuration parameters (also known as profiles) governing the operation of the mobile telephone UE-i. These profiles are defined by the user of the mobile telephone UE-i, for example using the data entry interface (keypad) connected to the screen 3 of the telephone.

By way of nonlimiting example, a profile can define adjustments of an operating parameter as a function of the location of the mobile telephone UE-i, for example activation or deactivation of a ringer or a call redirection facility, for example to a voicemail service or a different telephone number, the use of one ring tone rather than another, adjustment of the local time, and the like.

A profile can also define modes of triggering an event as a function of a change of location of the mobile telephone UE-i, for example switching off the telephone, emitting a specific warning ring tone, for example in the event of a meeting or journey associated with an area, and the like.

A profile can further define modes of operation of the mobile telephone UE-i as a function of specific information transmitted by a Node B belonging to a chosen area, for example to indicate presence within an area in which use of mobile telephones is prohibited, such as a theater, concert hall or aircraft. In these particular examples, the mobile telephone is switched off immediately specific information is received.

The above configuration profiles are stored in corresponding relationship to a status that preferably consists of a field, selected for example from the group comprising at least the following fields: "Home", "Office", "Other", "Meeting" and "Public area".

The location module 2 is designed to store location data taking the form of a set of (geo)location parameters defining the (location) geographical area $C_i$ in which the mobile telephone UE-i to which it is fitted is located. This kind of parameter set generally includes one or more cell identifiers and where applicable radio information representative in particular of the receive power of the base station (Node B) controlling the cell and/or the distance to the base station (Node B) controlling the cell (which is also known as the "timing advance"). The identifier is generally a location code, and is identical for all the Nodes B that constitute the same location geographical area, defined by the network operator. If a mobile telephone UE-i changes location geographical area, it exchanges information with the network, and in particular with the nearest Node B, which supplies it with its set of parameters. The operator can therefore locate the mobile telephone UE-i with an accuracy that depends on the size of the geographical location areas, and in particular on the number of Nodes B that it contains.

For example, as shown in FIG. 1, a first user of a first mobile telephone UE-1 and a second user of a second mobile telephone UE-2 both work in a first (location) geographical area C1. The second user lives in a second geographical area C2 and the first user lives in a third area C3. The first and second mobile telephones UE-1 and UE-2 each have two configuration profiles respectively associated with the "Office" and "Home" fields. When the first or second user enters the first area C1 on his way to his office, the configuration module 1 of his mobile telephone selects the configuration profile associated with the first area C1, which corresponds to the "Office" field, and then configures the mobile telephone with the selected set.

Likewise, when the first (or second) user leaves his office to go home, as soon as he enters the third area C3 (or the second area C2), the configuration module 1 of his mobile telephone selects the configuration profile associated with the third area C3 (or the second area C2), which corresponds to the "Home" field, and then configures the mobile telephone with the selected profile.

The processing device D includes a data processing module M adapted, firstly, to determine the geographical area $C_i$ in which the mobile telephone UE-i to which it is fitted is located. To this end, it interrogates the location module 2 of the mobile telephone UE-i, preferably periodically. The interrogation period is two or three minutes, for example (or any other value, as required). Once in possession of the set of parameters defining the geographical area, the processing module M stores it temporarily, for example in a buffer 4. This storage can where applicable be effected in corresponding relationship to the time of detection. In this case, the time of detection comprises the time of day and possibly the date (or the day of the week).

The processing module M is further adapted to analyze the sets stored in the buffer 4, at chosen intervals, in order to store in a memory 5 each set that satisfies at least one chosen criterion. This storage can where applicable be effected in corresponding relationship to chosen information. The interval (or period) is two or three days, for example (or any other value, as required), provided that it enables temporary storage of a significant number of identifiers, for example 50 or 100 identifiers).

The analysis effected by the processing module M preferably consists in extracting the stored sets from the buffer 4 and then counting out each set in order to compare the number associated with it to a threshold. If the number is above the threshold, then the set is retained and stored in the memory 5, where applicable in corresponding relationship to chosen information.

Alternatively, when each set has been counted out, the associated numbers are compared and their respective proportions relative to the total number of identifiers acquired during the chosen time interval is determined. The identifiers whose proportion is above a threshold, for example a threshold equal to 25%, are then retained.

The processing module M can be adapted to effect operations on some sets of parameters stored temporarily in order to determine whether two of the sets correspond to the same (geo)location, as a function of the required accuracy.

The information that may be associated with the sets retained is preferably representative of the time interval during which said sets were detected and where applicable the corresponding day or days of the week.

The configuration profiles can be associated with the various geographical areas $C_i$ designated by the sets stored in the memory 5 in the following manner.

A first solution, when the sets of location parameters are stored in corresponding relationship to time information, consists in the processing module M determining for itself to which profiles the respective location geographical areas correspond, as a function of the time intervals for which they have belonged to the sets (and possibly the days of the week), and using a time chart stored in corresponding relationship to the fields associated with the statuses stored in the configuration module 1.

For example, if the set of location parameters has been stored in the memory 5 in corresponding relationship to time intervals [8h30-12h00] and [14h00-19h00] on several consecutive business days, it is considered to correspond to the user's workplace. Consequently, the set of parameters can be associated with the "Office" field and therefore with the configuration profile that corresponds to it in the configuration module 1. On the other hand, if the set of location parameters is stored in the memory 5 in corresponding relationship to time intervals [19h30-8h00] and [12h30-13h30] for several consecutive business days or the interval [0h00-24h00] during the weekend, it is considered to correspond to the users home. Consequently, the set of location parameters can be associated with the "Home" field and therefore with the configuration profile that corresponds to it in the configuration module 1.

To effect the association automatically, the processing module M must therefore know the various fields associated with the various configuration profiles in the configuration module 1 and be adapted to supply the configuration module 1 with data that defines the location geographical areas $C_i$ and the corresponding fields in order for the configuration module to store them in corresponding relationship to the respective configuration profiles associated with said fields.

Two situations can be envisaged, according to whether a field is already associated with a configuration profile or not. A configuration profile can be associated with one or more (location) geographical areas. Consequently, if the profile designated by the processing module is not yet associated with an area, the latter is automatically associated with the field. On the other hand, if the designated profile is already associated with an area, then either that area is identical to that designated and the association procedure terminates, or it is different, in which case the processing module M prompts the user, for example on his screen 3, to associate this new area with the old one, in corresponding relationship to the configuration profile, or to substitute the new area for the old one. Of course, an additional option can be provided to enable the user to refuse the association prompted by the processing module M or to choose some other association.

A second solution is for the processing module M to function as in the second [sic] solution, except for the automatic association. In this case the processing module M does not effect the association itself. It verifies first if the area is already associated with the field with which it wishes to associate it. If so, the association procedure terminates. If not, it submits the proposed association to the user, for example by displaying on the screen 3 the information relating to the proposed association.

Once again two situations can be envisaged, depending on whether the field is already associated with a configuration profile or not. Consequently, if the profile designated by the processing module M is not yet associated with an area, the processing module M prompts the user to associate it with the detected new area, for example on his screen 3. The user can then refuse or accept the association. If he accepts it, the processing module M instructs the configuration module 1 to save the data of the area in corresponding relationship to the chosen field. If the user refuses, either the procedure terminates or the user selects on his screen 3 a field other than that offered, so that it is associated with the detected area. The processing module M then instructs the configuration module 1 to save the data of the area in corresponding relationship to the field chosen by the user.

On the other hand, if the designated profile is already associated with an area other than that proposed by the processing module M, the latter prompts the user, for example on his screen 3, either to associate that new area with the old one, in corresponding relationship to the configuration profile, or to substitute the new area for the old one.

If the processing module M does not store the sets of parameters of areas in corresponding relationship to time information, it cannot propose a chosen association to the user. Consequently, it offers the retained geographical areas to the user, who decides whether to associate them with statuses under the same conditions as previously described or not.

The processing module M preferably sends the proposed association to the user automatically when the latter enters the area which satisfies the criterion and is the subject of the proposal. In a first variant, the proposal is subjected to the user as soon as the processing module M has terminated the analysis of the sets of location parameters stored temporarily in the buffer 4 and, where applicable, has stored them in the memory 5. In a second variant, the proposed association (or just the area retained) is submitted to the user only if the latter decides to load the configuration menu offered by the configuration module 1 or the association menu offered by the processing module M. These two variants are less practical, however, since they necessitate a description of the areas proposed for an association.

If the user chooses to associate the new area with the old one, the processing module M instructs the configuration module 1 to save the data of the new area in corresponding relationship to the field chosen by the user and data of the preceding area. If the user refuses the association proposed by the processing module M, either the procedure is terminated or the user selects on his screen 3 a field other than that proposed, so that it is associated with the detected area. The processing module M then instructs the configuration module 1 to save the data of the area in corresponding relationship to the field chosen by the user.

When the association has been effected, the processing module M preferably generates a message indicating the operation that has been effected. For example, the message that is displayed on the screen 3 is "The area has been added to the "Office" field", "The new area replaces the area previously associated with the "Office" field", or "No modification has been effected".

The processing module M can offer the user a plurality of options on his screen 3. For example, one option can be to propose that the user deactivates (or activates) the processing module M. Another option can propose to the user information on (or descriptions of) the areas associated with the configuration profiles or the areas proposed for an association. A third option can present the operating modes of the processing module M.

To prevent an excessively large number of sets of parameters from being stored temporarily in the buffer 4 between two analyses, the processing module M can be adapted to "filter" said sets of location parameters periodically. Filtering can consist, for example, in retaining only the sets of location parameters that remain substantially identical over a chosen time interval. That time interval can be 10 or 20 minutes, for example. This type of filtering can advantageously provide time information to the processing module M which can, for example, store retained sets of parameters in the memory 5 in corresponding relationship, without having first to store temporarily in the buffer memory 4 the detection time (time of day and/or date) of said sets of location parameters.

The processing module M can take the form of electronic circuits, software (or data processing) modules, or a combination of circuits and software.

The invention also provides a method of processing location data for a mobile telephone device UE-i able to move in location geographical areas of a communication network defined by sets of location parameters.

The method can be implemented by the processing device D and the mobile telephone device UE-i described hereinabove. The main and optional functions and subfunctions provided by the steps of that method being substantially identical to those provided by the various means constituting the processing device D and the mobile telephone device UE-i, only the steps implementing the main functions of the method according to the invention are described hereinafter.

The method consists in, firstly, detecting at chosen times the geographical area in which the mobile telephone device UE-i is located and then temporarily storing a set of parameters representative of the detected geographical area $C_i$, where applicable in corresponding relationship to at least the time of detection, and, secondly, analyzing, at chosen intervals, the sets of location parameters that have been stored so as to retain only the sets of location parameters that satisfy at least one chosen criterion and, where applicable, to store them in corresponding relationship to the chosen information.

The method according to the invention preferably includes an additional step in which the stored sets of location parameters are associated with a status chosen either automatically as a function of the information, where applicable, or at the initiative of the user of the mobile telephone device UE-i, for example by selecting a status from a set of statuses displayed on the screen 3 of his mobile telephone device UE-i.

The invention is not limited to the embodiments of the method, processing device and mobile telephone device described hereinabove by way of example only, and encompasses all variants that the person skilled in the art might envisage that fall within the scope of the following claims.

The invention claimed is:

1. A method of treating location data for a mobile telephone device which can move in geographical areas of a communication network, said geographical areas being defined by sets of at least one location parameter,
    characterized in that said method comprises the following steps:
    i) detection of the geographical area in which said mobile telephone device is located at predetermined times, ii) temporary storage of a set of location parameters representative of said detected geographical area, iii) analysis of said sets of location parameters stored at chosen intervals, and iv) storage of each set of location parameters satisfying at least one chosen criterion, wherein said analysis comprises determining all the sets of location parameters and then counting out each set of location parameters, and in that each set of location parameters is stored in association with a number greater than a chosen threshold, said chosen criterion consisting of crossing said threshold to a value above said threshold.

2. A method according to claim 1, characterized in that said detection is periodic.

3. The method according to claim 2, characterized in that said analysis comprises determining all the sets of location parameters and then counting out each set of location parameters, and in that each set of location parameters is stored in association with a number greater than a chosen threshold, said chosen criterion consisting of crossing said threshold to a value above said threshold.

4. The method according to claim 2, characterized in that said analysis comprises determining all the different sets of location parameters and then counting out each of said different sets of location parameters to determine their respective relative proportions, and in that each set of location parameters is stored in association with a proportion greater than a chosen threshold, said chosen criterion consisting in the crossing of said threshold to a value above said threshold.

5. A method according to claim 2, characterized in that said detected geographical area is stored temporarily in corresponding relationship to at least its time of detection.

6. A method according to claim 2, characterized in that said set of location parameters is stored, after analysis, in corresponding relationship to chosen information.

7. The method according to claim 1, characterized in that said analysis comprises determining all the different sets of location parameters and then counting out each of said different sets of location parameters to determine their respective relative proportions, and in that each set of location parameters is stored in association with a proportion greater than a chosen threshold, said chosen criterion consisting in the crossing of said threshold to a value above said threshold.

8. A method according to claim 1, characterized in that said detected geographical area is stored temporarily in corresponding relationship to at least its time of detection.

9. A method according to claim 8, characterized in that said information is representative of a time interval associated with each set of location parameters satisfying said chosen criterion.

10. A method according to claim 1, characterized in that said set of location parameters is stored, after analysis, in corresponding relationship to chosen information.

11. A method according to claim 10, characterized in that said information is representative of a time interval associated with each set of location parameters satisfying said chosen criterion.

12. A method according to claim 1, characterized in that it includes an additional step in which a chosen status is associated with said stored sets of location parameters.

13. A method according to claim 12 wherein said set of location parameters is stored, after analysis, in corresponding relationship to chosen information, and further characterized in that said status association is effected automatically as a function of said information.

14. A method according to claim 13 wherein said information is representative of a time interval associated with each set of location parameters satisfying said chosen criterion, and further characterized in that said status association is effected automatically as a function of said information.

15. A method according to claim 12, characterized in that said status association is initiated by the user of said mobile telephone device by selecting a status from a set of statuses displayed on a screen of his mobile telephone device.

16. A method according to claim 12, characterized in that said status is a field associated with an operating configuration of said mobile telephone device.

17. A method according to claim 16, characterized in that said field is selected from the group including at least "Home", "Office" and "Other" fields.

18. A method according to claim 12, characterized in that said operating configuration is defined by the user of said mobile telephone device.

19. A method according to claim 12, characterized in that at least two different sets of location parameters satisfying said criterion can be associated with the same status.

20. A method according to claim 12, characterized in that each set of location parameters includes at least one parameter representative of a network cell identifier.

21. A method according to claim 1, characterized in that each set of location parameters includes at least one parameter representative of a network cell identifier.

22. A method according to claim 21, characterized in that some sets of location parameters include at least one complementary parameter selected from the group including radio information representative of the received power of a base station controlling said cell and/or the distance to the base station controlling said cell.

23. A location data processing device for a mobile telephone device which can move in geographical areas of a communication network defined by sets of at least one location parameter, characterized in that it includes processing means to determine the geographical area in which the mobile telephone device is located at predetermined times, and then to store temporarily a set of location parameters representative of said detected geographical area, and ii) to analyze said sets of location parameters stored at chosen intervals, in order to store each set of location parameters satisfying at least one chosen criterion, wherein said processing means are adapted to effect said analysis on the basis of a determination of different sets of location parameters, followed by counting out each set of location parameters, and to store each set of location parameters in association with a number above a chosen threshold, said chosen criterion consisting in the crossing of said threshold to a value above said threshold.

24. A device according to claim 23, characterized in that said processing means are adapted to effect said detection periodically.

25. A device according to claim 23, characterized in that said processing means are adapted to effect said analysis on the basis of determining different sets of location parameters followed by counting out of each of said different sets of location parameters to determine their respective relative proportions, and to store each set of location parameters in association with a proportion above a chosen threshold, said chosen criterion consisting in the crossing of said threshold to a value above said threshold.

26. A device according to claim 23, characterized in that said processing means are adapted to store said detected geographical area temporarily in corresponding relationship to at least one detection time.

27. A device according to claim 26, characterized in that said information is representative of a time interval associated with each set of location parameters satisfying said chosen criterion.

28. A device according to claim 23, characterized in that said processing means are adapted to store said set of location parameters, after analysis, in corresponding relationship to chosen information.

29. A device according to claim 28, characterized in that said information is representative of a time interval associated with each set of location parameters satisfying said chosen criterion.

30. A device according to claim 23, characterized in that said processing means are adapted to associate said stored sets of location parameters with a chosen status.

31. A device according to claim 30, characterized in that said processing means are adapted to effect said status association after selection by the user of said mobile telephone device of a status from a set of statuses displayed on a screen of the mobile telephone device.

32. A device according to claim 30, characterized in that said status is a field associated with an operating configuration of said mobile telephone device.

33. A device according to claim 32, characterized in that said field is selected from a group including at least "Home", "Office" and "Other" fields.

34. A device according to claim 30, characterized in that said operating configuration is defined by the user of said mobile telephone device.

35. A device according to claim 30, characterized in that said processing means are adapted to associate at least two different sets of location parameters satisfying said criterion with the same status.

36. A device according to claim 23, characterized in that each set of location parameters includes at least one parameter representative of a network cell identifier.

37. A device according to claim 36, characterized in that some sets of location parameters include at least one additional parameter selected from a group including radio information representative of the receive power of a base station controlling said cell and/or the distance to the base station controlling said cell.

38. A mobile telephone device able to move in geographical areas of a communication network defined by sets of at least one location parameter, characterized in that it includes a processing device according to claim 23.

39. A location data processing device for a mobile telephone device which can move in geographical areas of a communication network defined by sets of at least one location parameter, characterized in that it includes processing means adapted i) to determine the geographical area in which the mobile telephone device is located at predetermined times, and then to store temporarily a set of location parameters representative of said detected geographical area, and ii) to analyze said sets of location parameters stored at chosen intervals, in order to store each set of location parameters satisfying at least one chosen criterion, wherein said processing means are adapted to effect said status association automatically as a function of said information, and wherein said processing means are adapted to effect said analysis on the basis of a determination of different sets of location parameters, followed by counting out each set of location parameters, and to store each set of location parameters in association with a number above a chosen threshold, said chosen criterion consisting in the crossing of said threshold to a value above said threshold.

* * * * *